No. 888,112. PATENTED MAY 19, 1908.
R. MÜLLER.
GAS FURNACE FOR CHAIN LINK WELDING OR THE LIKE.
APPLICATION FILED AUG. 17, 1904.

2 SHEETS—SHEET 1.

Witnesses:
Paul Wollenberg
Otto Scholz

Inventor
Rudolf Müller
by Robert Deipler
Attorney

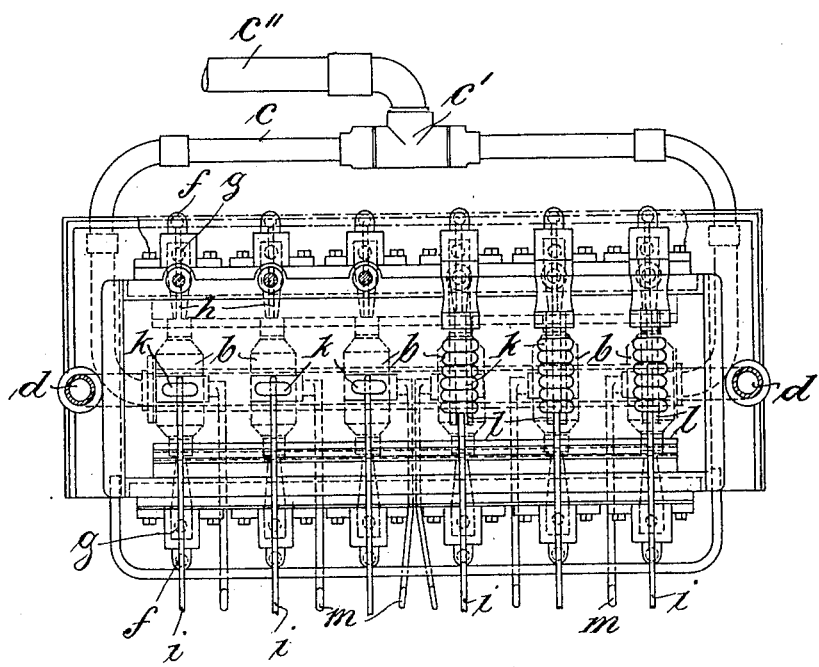

UNITED STATES PATENT OFFICE.

RUDOLF MÜLLER, OF GOTHENBURG, SWEDEN, ASSIGNOR TO THE FIRM OF MASCHINEN-FABRIK ST. GEORGEN BEI ST. GALLEN COMMANDIT-GESELLSCHAFT LUDWIG VON SÜSSKIND, OF ST. GALLEN, SWITZERLAND.

GAS-FURNACE FOR CHAIN-LINK WELDING OR THE LIKE.

No. 888,112.  Specification of Letters Patent.  Patented May 19, 1908.

Application filed August 17, 1904. Serial No. 221,161.

*To all whom it may concern:*

Be it known that I, RUDOLF MÜLLER, a subject of the German Emperor, and resident of Styrsö Tange, city of Gothenburg, in the Kingdom of Sweden, engineer, have invented certain new and useful Improvements in Gas-Furnaces for Chain-Link Welding or the Like, of which the following is an exact specification.

My invention relates to improvements in gas-furnaces for chain link welding or the like and also has for its purpose to operate modern chain-welding machines in a more economical manner. Several conditions must be fulfilled during the operation of a welding machine. A sufficient number of heated chain links must always be ready and further the links must all be equally heated, so that the welding of each link can be securely effected by the same number of hammer blows.

It is well known that the chain links to be welded have been hitherto heated by suspending the links into a common chamber with a more or less large extension for producing the necessary temperature. The combustion chamber or the furnace proper has been provided with one or two openings for discharging the gas to be mixed with water into the furnace.

According to my invention I subdivide the whole space into particular compartments thus forming a plurality of small heating chambers, each heating chamber serving to heat one single chain link. Furthermore each heating chamber is provided with a distinct heating arrangement to be described afterwards. By this arrangement a very equal heating of each single chain link is obtained.

Figure 1:
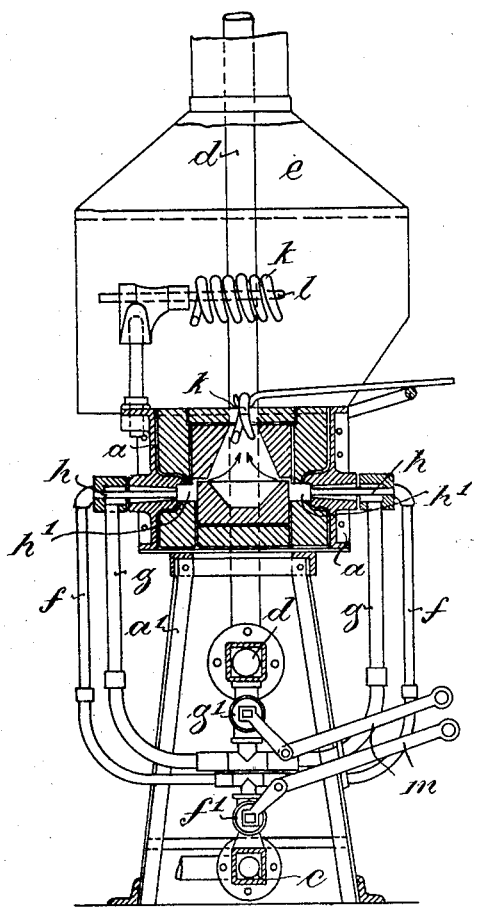
Figure 2:
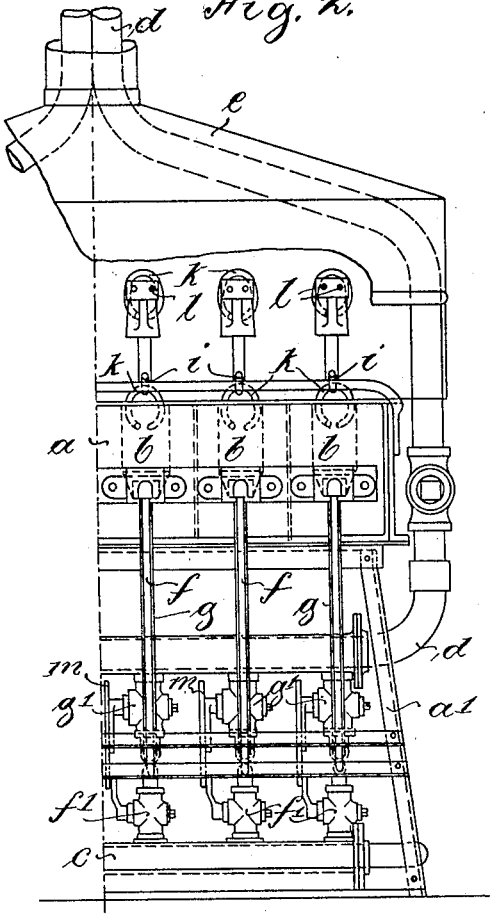

In order to make my invention clear, I refer to the accompanying drawings, in which:

Figure 1 shows a convenient construction of an improved welding furnace in vertical section, Fig. 2 is a partial side view, and Fig. 3 is a plan view.

In the drawing $a$ is a metal case resting upon a frame $a'$.

$b$ are heating chambers formed in the base $a$ by means of fire-bricks.

$a^2$ are metallic nozzles made integral with the casing and serving for the suitable introduction of air into the heating-chambers, and for imparting to the air a sufficient acceleration when entering the heating-chamber.

The furnace has six heating chambers $b$ so as to be able to heat six chain-links at the same time.

$c$ is a gas admission pipe and $d$ an air-admission pipe, both pipes being carried by the frame $a'$ and having a square cross section. The gas admission pipe $c$ consists of two branches, which enter the apparatus from opposite sides. Both branches are connected by means of the T-union $c'$ to a common pipe $c''$. The air admission pipe also consists of two branches, which enter the apparatus on opposite sides. Both ends of the pipe $d$ pass through the cowl or cover $e$ of the furnace and lead to the outside through the opening in this cover. Consequently the entering air is warmed by the outflowing gases of combustion. For obtaining a uniform distribution of the gas and air entering both branches of the pipes $c$ and $d$ these pipes are preferably divided by partitions at the point, where the branches meet below the case $a$.

From the admission pipes $c$ and $d$ a number of branch pipes $f$ and $g$ are connected at opposite points. The unions $f''$ and $g'$ are provided with valves by means of which the gas or air entering the several branch-pipes can be adjusted as desired.

$m$ $m$ are rods for operating the valves.

The branch pipes $f$ and $g$ discharge into nozzles $h$ and the latter into small chambers $h'$, where an intimate mixing takes place of the air and gases entering through the branch pipes and nozzles, and at the same time a heating of the mixture takes place. From the chambers $h'$ the mixture flows into the chambers $b$ where it burns. The two streams entering each chamber at opposite points meet each other in the middle of the chamber and direct the generated heat upon a chain link $k$ which hangs upon a hook $i$. The different chambers $b$ are narrowed at their upper part showing about a pear-shaped form, so that loss of heat is avoided and all the heat generated is employed for heating the chain links.

$l$ $l$ are arms upon which the open links to be heated are placed, upon which a preliminary heating takes place.

$i'$ $i'$ are bars by means of which the links

*k* are placed into the exit opening on the chambers *b*.

Having thus fully described the nature of this invention, what I desire to secure by Letters Patent of the United States is:—

1. A chain-link-welding furnace, comprising a casing lined with refractory material, and provided with two series of nozzles, oppositely arranged each to the other, chambers in said casing, each chamber being provided with a top opening, air-pipes discharging into said nozzles, in communication with said chambers, and gas-pipes passing with their free ends through said nozzles, and communicating with the said chambers, and means for suspending the chain-links to be welded in said top-openings.

2. A chain-link-welding furnace comprising a casing lined with refractory material, and provided with two series of nozzles oppositely arranged each to the other, chambers in said casing, each chamber being provided with a top opening, two series of mixing chambers in communication with the said chambers and the nozzles, air-pipes discharging into said nozzles, and gas-pipes passing with their free ends through said nozzles and discharging into said mixing chambers, and means for suspending the chain-links in said top-openings.

3. A chain-link-welding furnace comprising a casing lined with refractory material, and provided with two series of nozzles oppositely arranged each to the other, chambers in said casing, each chamber being provided with a top opening, two series of mixing chambers in communication with the said chambers and said nozzles, a common air- and a common gas-conduit, arranged below said casing, branch-pipes leading from the air-conduit to said nozzles, branch-pipes joined at their one ends to the gas-conduit, and passing with their other ends through said nozzles to discharge into said mixing chamber, and means for suspending the chain-links in said top-openings.

4. A chain-link-welding furnace comprising a casing, lined with refractory material, and provided with two series of nozzles, oppositely arranged each to the other, chambers in said casing, each chamber being provided with a top-opening, two series of mixing chambers in communication with the said chambers and said nozzles, a common air-conduit and a common-gas-conduit, arranged below said casing, branch-pipes leading from the air-conduit to said nozzles, branch-pipes joined at their one ends to the gas-conduit, and passing with their other ends through said nozzles, to discharge into said mixing-chambers, means for suspending the chain-links in said top-openings, and a cover into which said top-openings discharge and through which the air-conduit is led in part for preheating the air.

In testimony whereof I have signed my name to this specification in the presence of two subscribing witnesses.

RUDOLF MÜLLER.

Witnesses.
  F. W. HOECK,
  C. WIED.